May 8, 1962  R. A. LUBBEN  3,033,783
FILTER AND METHOD OF PRODUCING SAME
Filed April 7, 1958  3 Sheets-Sheet 3
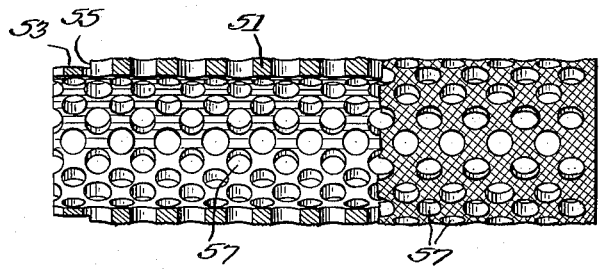
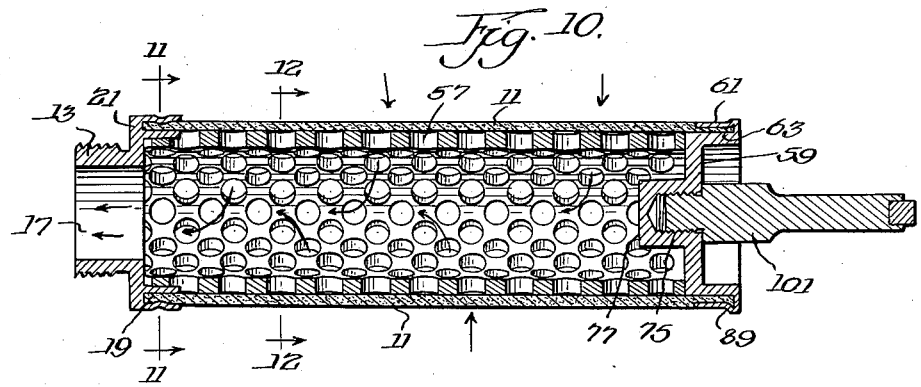
Inventor.
Robert A. Lubben.
By Merriam, Lorch, & Smith.
Attys.

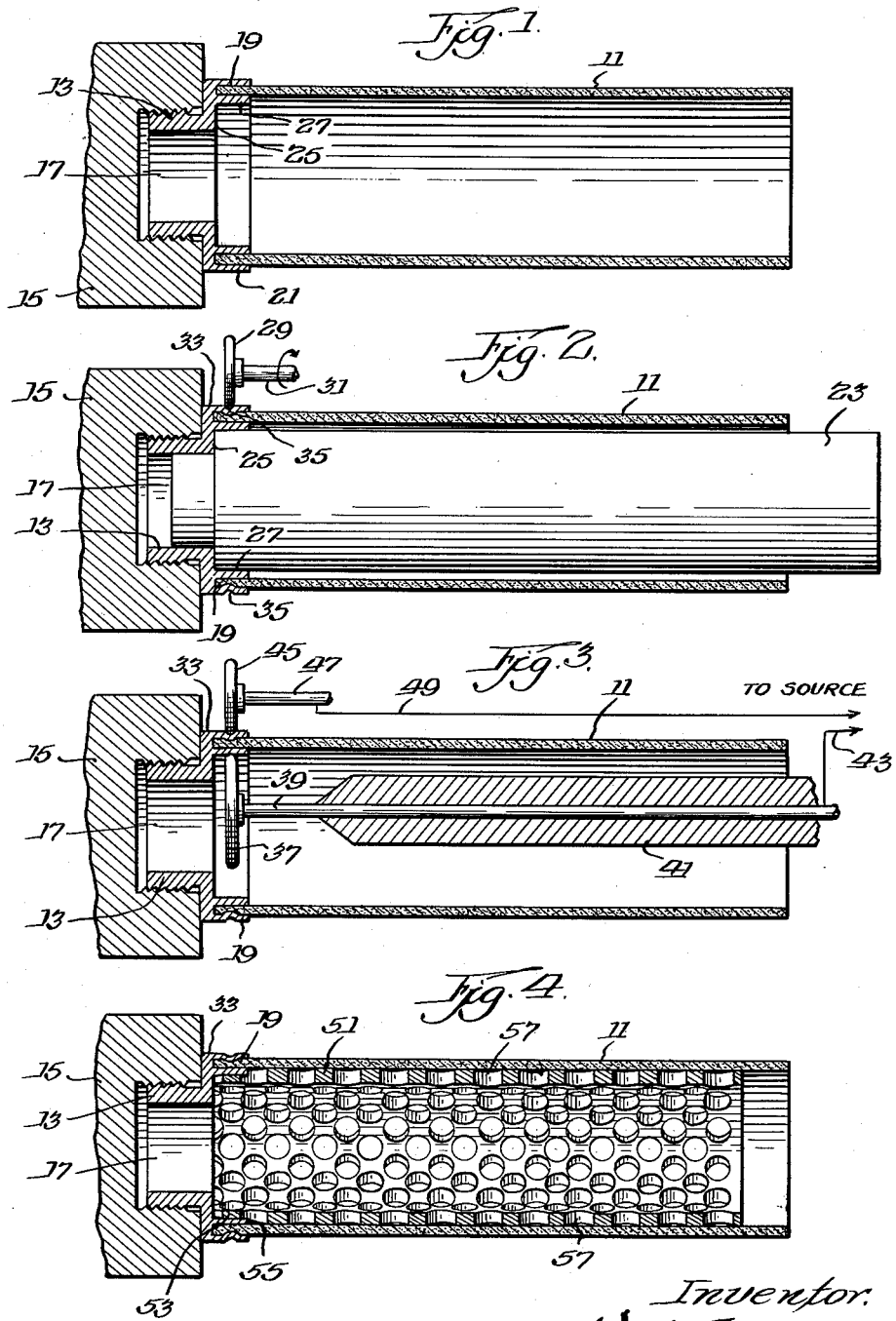

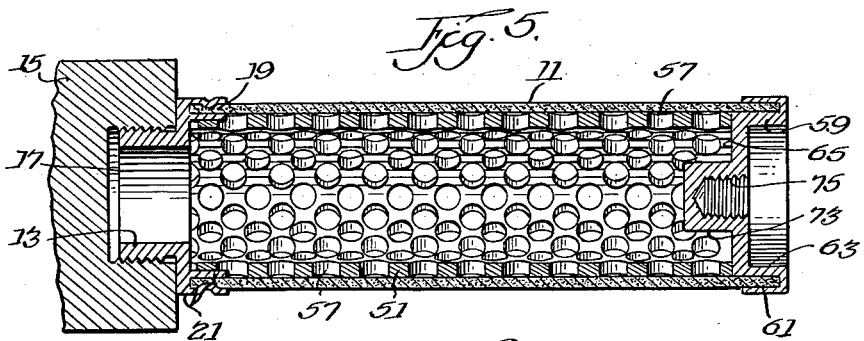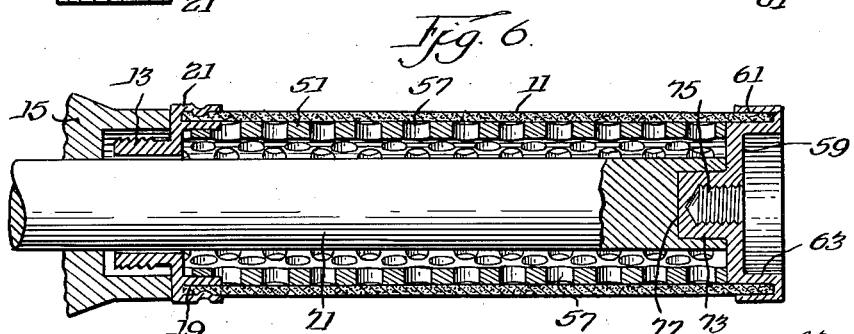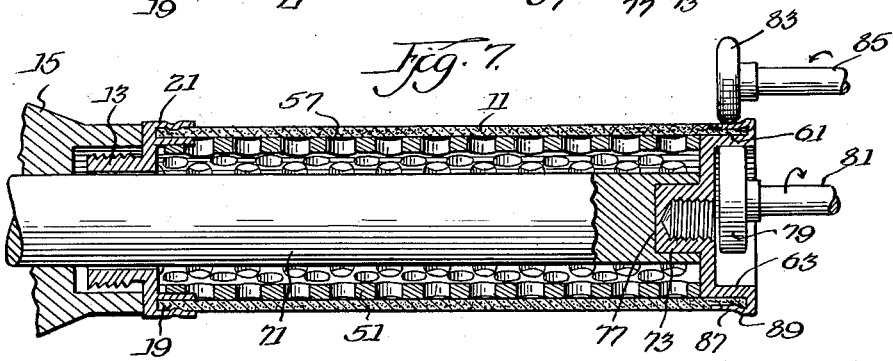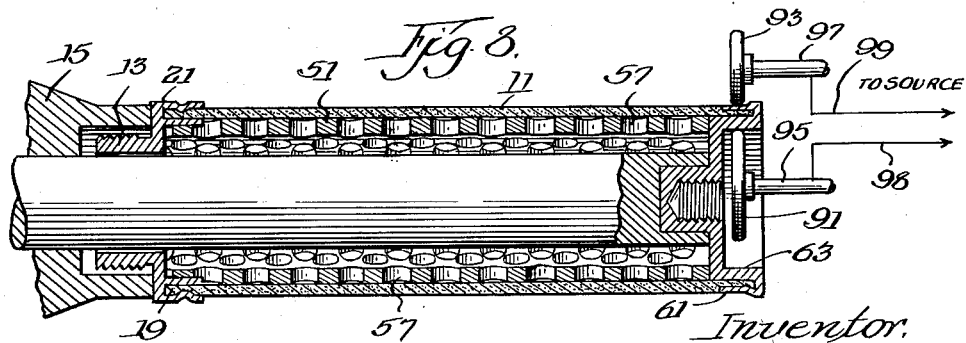

3,033,783
FILTER AND METHOD OF PRODUCING SAME
Robert A. Lubben, Hollywood, Calif., assignor to Permanent Filter Corporation, Los Angeles, Calif., a corporation of California
Filed Apr. 7, 1958, Ser. No. 726,673
4 Claims. (Cl. 210—510)

This invention relates to filters for removing contaminants from fluids supplied thereto.

In particular this invention is directed to a filter element of the sintered metallic tubular type having fittings weld-secured to each end thereof. In practice the filter element per se is formed as a tubular element of desired wall thickness and suitable length, the filtering component having been produced by sintering extremely fine particulated metallic particles so that fluid may be passed therethrough to remove contaminants. The sintering process causes the different metallic particles of which the tubular element is formed into a substantially unitary mass and, depending upon the particle size, it is possible to determine the size of contaminating substances which are unable to pass with the fluid flowing therethrough.

Usually, the sintered filter element is included as a component of a larger filtering device into which fluid is forced under pressure to be passed through the tubular filter element, usually from its external wall through to its internal wall. One of the fittings secured to the filter is usually closed (although this is not a criterion of the invention) and the other is usually centrally open so that fluid flowing into the tubular region may be passed outwardly from this opening. The invention, as is particularly constituted, is arranged to provide for suitably welding the fittings to the ends of the tubular member thereby to insure a tight fit to prevent leakage and, at the same time, provide general securement of the ends of the sintered element. In addition, within the tubular end fittings, a reinforcing metallic tube having numerous openings extending for the length thereof and arranged about the periphery thereof in staggered relationship is usually mounted internally of the tubular sintered element for the length thereof in order to insure inward support for the sintered element and thus provide strengthening. The fluid flow then is through the opening in the reinforcing element in sequence with the sintered device.

In its more important aspects this invention serves to provide a filter element of the sintered type, more or less in cartridge form, so that the unit can be readily inserted and removed from a filter component, particularly for the purpose of cleaning, at any desired time such as that when a substantial amount of contamination has been acquired by the filter as a result of fluid flow therethrough. Where contaminants are retained in the filter any attempt to pass fluid, even under pressure, through the filter results in a substantial pressure drop therethrough. This factor makes the system in which the fluid is being circulated less efficient, often carrying it to the danger point where the filter is saturated with foreign substances.

The invention, as will herein be described, will set forth not only the filter component as it is finally constructed but also the process and method by which the filter is produced and whereby in the construction of the filter the end caps are securely welded to the main tubular filter element to prevent separation and to make the complete device into an integral unit.

With the foregoing in mind it becomes one of the primary objects of the invention to form a tubular sintered filter element with the sintered component extending between end-fittings which are permanently secured thereto.

Another object of the invention is that of providing a tubular sintered filter component usable as a unit within a filtering device and which may be readily removed from such device for servicing and cleaning, later to be re-used.

Other objects of the invention are those of providing a method of forming tubular sintered filter elements with welded end-fitting components to provide ready attachment of the unit in utilization apparatus.

Other objects of the invention are those of providing a filter element having integrally secured end-fittings which shall be efficient in the operation, which can be constructed in a minimum of time and at minimum expense, which shall be strong structurally, and which may be made by following the same constructional principles in different filter sizes, both as to filter diameter and as to filter length.

Other objects of the invention will become apparent from a reading of the following description and claims in connection with the accompanying drawings.

By the drawings, FIGS. 1 through 8 inclusive, each show in section and in general flow diagram style the constructional steps for forming the tubular sintered filter element with the end caps integrally secured thereto. In these figures:

FIG. 1 shows the first step of securing one end of the tubular sintered element in one end cap;

FIG. 2 illustrates the formation of a bead about the outer periphery of the end-cap tube-holding recess for tightly supporting the sintered element therein;

FIG. 3 illustrates the welding of the tubular sintered element in the end recess of one end-cap, the welding being achieved at the location of the formed bead in FIG. 2;

FIG. 4 illustrates the reinforcing step whereby a tubular reinforcing element is inserted within the tubular sintered element welded within the recess of the end-cap and held in close adjustment with respect to the end-cap;

FIG. 5 illustrates the attachment of a closing end-cap at the second end of the tubular sintered filter element;

FIG. 6 illustrates a support mechanism for holding the second end-cap to the second end of the tubular filter element prior to welding;

FIG. 7 illustrates the formation of a bead and lip at the outer end of the tubular sintered filter element for securing the end-cap thereto; and FIG. 8 illustrates the welding step and securing the second end-cap to the tubular sintered filter element. Each of FIGS. 1 through 8 is generally schematic in nature, although each is intended to show principlewise the formation steps for producing the filter element;

FIG. 9 schematically represents, partially in section and partially in elevation, the metallic reinforcing element adapted for insertion internally of the tubular sintered filter element at a time following the bead formation and the welding step for securing the first end-cap to one end of the tubular sintered filter element;

FIG. 10 illustrates in section the assembled filter element with its end-caps welded thereto, the assembly being internally reinforced by the internal tubular reinforcing element;

FIG. 11 is a sectional view of the structure of FIG. 10, taken on the line 11—11 of FIG. 10, showing particularly the assembled filter element following the welding operation for securing the end-cap and the tubular sintered filter element together and the insertion therein of the tubular reinforcing element; and FIG. 12 is a sectional view, taken on the line 12—12 of FIG. 10 to illustrate the filter structure in section with the outer tubular sintered filter element surrounding the inner tubular reinforcing element nested therein.

Referring now to the drawings for a further understanding of the invention, generally speaking, the filter structure is assembled within a lathe element. In this consideration it will be assumed that the tubular sintered filter element 11 is a known component formed according to methods practiced by the corporation to which this application is assigned and, further, which is now embodied in commercially sold apparatus. This filter element is formed of particulated metallic particles sintered into a generally fused and fluid-porous mass. The metallic particles are of generally spherical shape and thus when formed and pressed into the tubular configuration in the sintering process to provide the tubular element illustrated by the numeral 11 have about them numerous minute-sized passageways through the tubular wall. Any fluid entering the tubular member from a region external to its periphery can pass interiorly thereof to be discharged from within the said tubular member in a cleaned state with contaminants caught by the sintered element. The flow can also be from the interior of the tubular member outwardly with the same effect produced, although this reversed direction of flow is usually not used in practice.

The tubular sintered filter element to be used efficiently requires end-supports to hold it. Likewise, to offer the maximum advantage in operation, it requires tight or integral securement of the end-supports to the filter element.

This invention provides for the formation of the filter assembly by mounting one of the end-cap members 13 into a suitable chuck 15. As here disclosed, this end-cap is an open ended member having a central opening 17. It is secured, as indicated, into a lathe chuck by the external threads which, in the final utilization of the filter following its assembly and construction, may be used to attach the filter element within any selected housing or container. The end-cap 13 in its formation is provided about its periphery with an annular recess or groove 19 into which one end of the tubular sintered element 11 is pressed for positioning and support. The inner walls of the annular groove 19 are tapered very slightly inwardly so that, when the tubular sintered filter element 11 is pressed therein, it may be tightly fitted and nested at the bottom of the circular or annular groove and spaced from the cap rim or wall 21 of the end-cap 13. This fit can be provided while the end-cap 13 is secured in the chuck 15, which may be the usual lathe pot-chuck. The length and diameter of the tubular sintered filter element 11, of course, can be made in accordance with the length and diameter of the filter required to provide the desired filter area. These dimensions are not critical to the operation or construction.

With the tubular sintered filter element 11 having been positioned within the groove or recess 19 extending inwardly from the wall 21 of the cap 13, and the taper of the slot or groove being such as to taper inwardly, it can be appreciated that although this provides a reasonably tight fit, unless further steps are taken securely to fasten this element, the cap might readily be removed or separated from the tubular filter in its use. The first step in the fabrication of the final structure is then to place internally of the tubular filter element 11 a suitable mandrel 23 which may be held at its right hand end in any desired manner (not shown), such as in the tail stock of the lathe, and caused to bear against the internal shoulder 25 of the end-cap 13 and to fit generally tightly within the inner wall 27 of the cap, this inner wall being the wall separating the inwardly extending groove or notch 19 and the inner periphery of the outwardly extending cap section into which the tubular sintered filter element is positioned. The outer diameter of the mandrel 23 should be substantially equal to the inner diameter of the circle upon which inner wall 27 of the cap section is formed and into which the tubular sintered filter element is mounted so that a tight fit (and yet one which can be readily broken apart) is established. The inner wall of the cap is tightly held to the mandrel.

So supported, with the securement of the tubular sintered filter element and the cap being a pressed fit, and the mandrel 23 being secured within the cap also being a pressed fit, a roller 29, carried upon a shaft 31 and supported and driven from any desired position (not shown) is pressed tightly against the outer wall 21 of the recessed or grooved section 19 of the cap 13. Then, with the chuck 15 caused to revolve by any desired means, such as the lathe drive power, and the right hand end of the mandrel 23 held by the lathe tail stock, for instance, to press tightly against the bottom wall 25 of the cap, the wall 29, with rotation of the chuck and the therein-held cap 13 and its supported tubular sintered filter element 11, the spinning action and the pressure applied against the outer wall 33 of the cap being controllable, the bead, indicated at 35 (see FIG. 2) may be formed to any desired depth.

In one illustrative form the bead is provided for a filter having an overall outside diameter of approximately 1½" with a bead approximately ¼" wide and depressed approximately 0.050".

The formation of the bead tends to bind the tubular sintered filter element tightly within the groove or recess of the cap, although the securement does not form the two components at this point as integral elements. By the following step in the process, as diagrammed by FIG. 3, the cap 13 is retained threaded into the pot-chuck of the lathe. The mandrel 23 is removed from its position internally of the tubular sintered filter element 11 and the end-cap 13. In its stead there is then positioned internally of the tubular filter element 11 from its open end a suitable welding electrode in the form of a wheel-like element 37, supported to rotate upon a shaft 39, held within an elongated bearing shaft 41 which is supported in any desired manner externally to the assembly (not shown).

The welding electrode, in the form of the wheel 37, is then pressed tightly against the inner wall 27 of the cap 13 at a point opposite that at which the bead 35 had been formed in that portion of the process described by FIG. 2. One end of the shaft 39 may then be connected by way of the conductor 43 to any suitable source of electrical energy (not shown) to provide the welding current. A second welding electrode, also shown in the form of a wheel 45 is held on a shaft or spindle 47 and arranged in any appropriate manner (not shown) to press within the previously formed groove or bead 35 so that, when held tightly within the bead, and with the welding electrode 37 contacting the inner wall 27, and with the conducting shaft 47 being connected through a conductor 49 to the same source of current (not shown) to which conductor 43 and the welding electrode 37 are connected, it is apparent that with rotation of the lathe-chuck 15 and the maintenance of a tight connection between the welding electrodes 37 and 45 and each side of the tubular element a resistance weld may be formed upon energization of the welding electrodes by closing the circuit from conductors 43 and 49 in any desired manner (not shown) to the current source (also not shown).

In a preferred form of the invention here mentioned as illustrative the fitting or end-cap 13 is formed as a bronze element. The tubular sintered filter element 11 is formed of particulated bronze. With application of current to the welding electrodes 37 and 45, as above defined, a welded mass of the sintered element 11 closely welded to the grooved walls and intimately secured to the tubular member and the cap is provided.

For many uses this form of securement is generally adequate. However, for reinforcing purposes and for strengthening mechanically the filter as a whole it is desirable, at this point in the procedure, to place within the filter element 11 a reinforcing perforated metallic element 51 whose outer diameter, as already suggested, is substantially equal to that of the inner diameter of the tubular sintered filter element 11. One end of the metallic reinforcing tubular element, which, with the bronze fittings and the tubular sintered filter element formed of particulated bronze, may be aluminum, is formed with an end shoulder having a downwardly depending portion 53 equal in height to the height of the collar on the inner wall 19 of the end-cap 13. The shoulder 55 extends inwardly over the outer end of the inner wall 19 within which the tubular element 11 is fitted. The depth of the shoulder 55 corresponds to the width of the shoulders formed at the upper edge of the recess so that the filter element as a whole has rigid support throughout its length. The reinforcing element 51 of metal has about it periphery numerous openings or perforations 57 each of which extends completely through the wall and all are arranged in staggered relationship completely around the tubular member so that fluid passing through the sintered element 11 shall have free passage over the entire area of the tubular reinforcing element 51 except for that limited area which is not cut out by the staggered openings 57.

FIGS. 11 and 12 generally represent in rather schematic form the relationship of the openings 57, considered circumferentially. The remaining figures of the drawing show the reinforcing tubular element 51 schematically and represent the longitudinal spacing of the openings.

With this assembly having been effected and, of course, the welding electrodes shown by FIG. 3 having been removed prior to the insertion of the reinforcing element 51, it can be considered that one end of the tubular filter 11 has been tightly secured to its end-fitting 13. The second end of the filter as here illustrated may be considered as a cap which closes off its outer end. The cap element illustratively shown at 59 (see FIG. 5) likewise has a circumferential groove or recess 61, extending thereabout. The central section of the cap likewise may be recessed, as shown at 63. This is done particularly for the manufacturing step of providing for the insertion therein of a welding electrode, later to be explained. In the initial step of securing the end-cap 59 to the filter, the cap member is fitted over the outer edge of the tubular sintered element 11 which is pressed to rest at the base of the recess. The reinforcing element is then caused to abut the inner wall 65 of the end-cap. This determines the length of the filter element.

The extent that the tubular sintered filter element extends beyond the right hand termination of the reinforcing element 51, as shown by FIG. 5, corresponds to the depth of the annular groove or recess 61 in the end-cap. Like the end-cap 13, the end-cap 59 has a generally tapered recess or groove so that the tubular sintered filter element 11 may be generally force-fitted therein. This provides initially a reasonably tight fit which, as will herein later be explained, is tightened by the manipulating steps of beading the end of the cap and welding it to the tubular sintered element in a manner generally similar to that heretofore explained.

Referring now to FIG. 6, the unit as a whole may be assembled by positioning a mandrel 71 through an open central section of the lathe-chuck 15 and passing the same mandrel through the opening 17 of the end-cap 13 until it surrounds the inwardly extending section 73 of the end-cap 59. The inwardly extending section 73 is internally tapped and screw-threaded, as shown at 75. With the mandrel 71 positioned and held from its left end in any suitable manner (not shown), and its recessed end 77 fitted over the inwardly protruding portion 73, it can be appreciated that the end-cap 59 may be pressed very tightly against the reinforcing tube 51 and the tubular sintered filter element 11, it being assumed, illustratively, that the cap 59 is rested against a lathe tail stock (not shown) which may be appropriately moved to force the cap to the left from the position shown, it also being assumed, of course, that the lathe-chuck 15 is held in a fixed position.

Following the force fitting of the end-cap 59 over the end of the tubular sintered filter element 11 to place it securely within the recess 61 and the cap forced inwardly to contact the edge of the tubular reinforcing element 57, and with the assembly supported over the mandrel 71, a wheel 79, supported to turn about a firmly held shaft 81, is positioned to support the inner edge 63 of the recessed cap 59. On the outside edge of the end-cap 59 a roller 83, carried and supported upon the shaft 85, is pressed against the outer edge 87 of the end-cap. Applying pressure between the rollers 79 and 93 to bring them closely together, and with the end-cap 59 being formed of a metal such as bronze, a further beaded edge, conventionally indicated at 89, is formed to bind tightly the tubular sintered filter element 11 into the recess 61 in a manner somewhat similar to the securement of the opposite end of the tubular sintered filter element 11 within the recess 19 of the cap 13.

With this having been accomplished the rollers 79 and 83 are removed from internally of the end-cap 59 and externally thereto and a pair of welding electrodes 91 and 93, each formed as rollers and carried respectively upon shafts 95 and 97 is brought to contact the inner and outer walls of the end-cap 59 in the region where the beading 89 has been provided. By connecting the welding electrodes 91 and 93 through the respective shafts 95 and 97 and conductors 98 and 99 to a suitable current source (not shown) and by turning the complete assembly in the chuck 15, a welding current may be caused to flow between electrodes 79 and 83 and through the sintered element 11 securely to weld the end-cap to the tubular sintered filter element in the region immediately below and above the welding electrodes which press against the inner and outer walls of the recess in the cap so that tight securement of fitting is provided.

In the use of the filter element it is usually desirable securely to support the assembled component and to this end the showing of FIG. 10 indicates purely schematically the attachment of a supporting mandrel or stub 101, threadedly secured within the end-cap 59. Under these conditions, with the filter unit assembled, it will be apparent that fluid from any appropriate source forced externally of the tubular sintered filter element may be caused to flow therethrough and through the openings 57 in the reinforcing tubular element to flow outwardly from the end-cap 13 through its central opening 17 for being supplied to any desired type of utilization apparatus.

Many and various modifications of the specific structure here disclosed and certain modifications of the process of formation herein described may be resorted to and it is, therefore, believed that the invention should be broadly interpreted in the light of the foregoing description insofar as can be done within the scope of the claims hereafter appended.

Having now described the invention what is claimed is:

1. The method of forming a filter structure having a metal end-cap with a peripheral recess of a shape and width corresponding to the cross-section of one end of a generally tubularly-shaped sintered metal element and also having a central opening extending therethrough, which comprises positioning the sintered metal tubular element within the recess of the end-cap, supporting the end-cap for holding the assembled components, positioning a mandrel internally of the end-cap and the tubular member to bear upon the inner wall of the recess in which the sintered element is supported, forcing the outer recess well inwardly against the recess-located end of the sintered element against the mandrel as a fixed element to form an inwardly extending beading about the external surface of the cap substantially to lock the sintered metal element thereto within the recess and then resistance welding the sintered element within the recess of the end-cap permanently to secure the two elements together.

2. The method of forming a filter structure having a metal end-cap with a peripheral recess of a shape and width corresponding to the cross-section of one end of a generally tubularly-shaped sintered metal element and also having a central opening extending therethrough, which comprises positioning the sintered metal tubular element within the recess of the end-cap, supporting the end-cap for holding the assembled components, positioning a mandrel internally of the end-cap and the tubular member to bear upon the inner wall of the recess in which the sintered element is supported, forcing the outer recess wall inwardly against the recess-located end of the sintered element against the mandrel as a fixed element to form an inwardly extending beading about the external surface of the cap substantially to lock the sintered metal element thereto within the recess, then resistance welding the sintered element within the recess of the end-cap permanently to secure the two elements together, positioning a reinforcing randomly perforated tubular element internally of the sintered tubular element with the outer periphery of the reinforcing element substantially in engagement with the inner periphery of the sintered element and securing the reinforcing element in position.

3. The method of forming a filter structure having a plurality of metal end-caps with a peripheral recess of a shape and width corresponding to the cross-section of one end of a generally tubularly-shaped sintered metal element and also having a central opening extending therethrough, which comprises positioning the sintered metal tubular element within the recess of the end-cap, supporting the end-cap for holding the assembled components, positioning a mandrel internally of the end-cap and the tubular member to bear upon the inner wall of the recess in which the sintered element is supported, forcing the outer recess wall inwardly against the recess-located end of the sintered element against the mandrel as a fixed element to form an inwardly extending beading about the external surface of the cap substantially to lock the sintered metal element thereto within the recess, then resistance welding the sintered element within the recess of the end-cap permanently to secure the two elements together, positioning a reinforcing randomly perforated tubular element internally of the sintered tubular element with the outer periphery of the reinforcing element substantially in engagement with the inner periphery of the sintered element and securing the reinforcing element in position, positioning a second end-cap having a peripheral recess corresponding to the cross-section of the tubular element so that the end-cap fits over the free end of the sintered tubular element with the interior of the recess in the end-cap rested against the free end of the reinforcing element, beading the outer periphery of the second positioned end-cap member thereby to form a semi-permanent securement between the second end-cap and the sintered tubular element, welding the end-cap to the sintered tubular element about the periphery of the beaded end-cap permanently to secure the sintered element and the end-cap and to retain the reinforcing element semi-rigidly located between the two end-caps whereby a fluid passage is provided between the exterior of the sintered tubular element, through the sintered tubular element and the openings of the reinforcing element into its interior and externally through the central opening of one of the caps.

4. The method of securing a plurality of metal end-caps to a tubular sintered metallic element where each end-cap has a peripheral recess of a shape and width corresponding to that of the ends of the tubular sintered metal element and at least one of the end-caps has a central opening extending therethrough, which comprises positioning the sintered metallic tubular element within the recess of one of the end-caps, supporting the assembled elements upon a mandrel positioned internally of the end-cap and adjacent to the recess in which the sintered element is supported, applying pressure in along a band within the depth of the recess with the pressure being exerted between the recess walls and through the supported region of the tubular sintered element for beading the external surface of the cap substantially to lock the sintered metal element thereto within the recess, resistance welding the sintered element within the recess of the end-cap to the end-cap in the region of the bead permanently to secure the two together, removing the mandrel and then positioning a reinforcing randomly perforated tubular element internally of the sintered tubular element with the outer periphery engaging the inner periphery of the sintered element and the reinforcing element abutting the inner wall of the end-cap, positioning a second metallic end-cap also having a peripheral recess of a cross-section corresponding to the cross-section of the tubular element over the free end of the sintered tubular element and resting the interior of the said end-cap against the free end of the reinforcing element, again beading the outer periphery of the second positioned end-cap member thereby to form a semi- permanent securement between the said end-cap and the sintered tubular element, welding the end-cap to the sintered tubular element about the periphery of the beaded end-cap permanently to secure the sintered element and the said end-cap and to retain the reinforcing element substantially fixedly located between the two caps, the reinforcing element preventing inward deformation of the sintered element and the combination permitting fluid passage in each selected direction between the exterior of the sintered tubular element, the sintered tubular element, and the openings of the reinforcing element to its interior and externally through the central opening of one of the caps.

References Cited in the file of this patent

UNITED STATES PATENTS

| | | |
|---|---|---|
| Re. 21,921 | Greulich | Oct. 14, 1941 |
| 949,357 | Hebbeler | Feb. 15, 1910 |
| 1,648,026 | Murray | Nov. 8, 1927 |
| 2,068,858 | Jones | Jan. 26, 1937 |
| 2,300,381 | Hardy | Oct. 27, 1942 |
| 2,359,386 | Reinsch | Oct. 3, 1944 |
| 2,530,223 | Breux | Nov. 14, 1950 |
| 2,600,150 | Abendroth | June 10, 1952 |

FOREIGN PATENTS

| | | |
|---|---|---|
| 75,920 | Holland | Sept. 15, 1954 |